United States Patent [19]
Piazza et al.

[11] Patent Number: 6,072,505
[45] Date of Patent: Jun. 6, 2000

[54] METHOD AND APPARATUS TO EFFICIENTLY INTERPOLATE POLYGON ATTRIBUTES IN TWO DIMENSIONS AT A PRESCRIBED CLOCK RATE

[75] Inventors: Thomas A. Piazza, Granite Bay, Calif.; R. Scott Hartog; Michael Mantor, both of Orlando, Fla.; Jeffrey D. Potter, Winter Springs, Fla.; Ralph Clayton Taylor, Deland, Fla.; Michael A. Mang, Oviedo, Fla.

[73] Assignee: Real 3D, Inc., Orlando, Fla.

[21] Appl. No.: 09/053,589

[22] Filed: Apr. 1, 1998

[51] Int. Cl.[7] .............................. G06T 1/00; G06F 15/00
[52] U.S. Cl. ..................... 345/501; 345/523; 345/443
[58] Field of Search ..................... 345/429, 428, 345/440–443, 418, 501–503, 523, 507

[56] References Cited

U.S. PATENT DOCUMENTS

| | | | |
|---|---|---|---|
| 5,214,753 | 5/1993 | Lee et al. ............................... | 395/125 |
| 5,253,339 | 10/1993 | Wells et al. ............................ | 395/126 |
| 5,758,045 | 5/1998 | Moon et al. ........................... | 345/422 |
| 5,982,384 | 11/1999 | Prouty et al. ......................... | 345/441 |

*Primary Examiner*—Kee M. Tung
*Attorney, Agent, or Firm*—Scully, Scott, Murphy & Presser

[57] ABSTRACT

A rasterizer comprised of a bounding box calculator, a plane converter, a windower, and incrementers. For each polygon to be processed, a bounding box calculation is performed which determines the display screen area, in spans, that totally encloses the polygon and passes the data to the plane converter. The plane converter also receives as input attribute values for each vertex of the polygon. The plane converter computes planar coefficients for each attribute of the polygon, for each of the edges of the polygon. The plane converter unit computes the start pixel center location at a start span and a starting coefficient value at that pixel center. The computed coefficients also include the rate of change or gradient, for each polygon attribute in the x and y directions, respectively. The plane converter also computes line coefficients for each of the edges of the polygon. Line equation values are passed through to the windower where further calculations allow the windower to determine which spans are either covered or intersected by the polygon. The incrementers receive the span coverage data from the windower in addition to receiving planar coefficient values from the plane converter. The incrementers utilize the data from both the windower and plane converter to walk or traverse the polygon in those intersected spans, pixel by pixel. As the incrementer visits each pixel, vertex attribute values are interpolated to each pixel.

30 Claims, 8 Drawing Sheets

METHOD AND APPARATUS TO EFFICIENTLY INTERPOLATE POLYGON ATTRIBUTES IN TWO DIMENSIONS AT A PRESCRIBED CLOCK RATE

BACKGROUND OF THE INVENTION

1. Technical Field

The present invention relates generally to computer graphics, and more particularly to a method and apparatus for efficiently rasterizing polygons in two dimensions.

2. Description of the Related Art

Computer graphics designers commonly model objects with polygons defined by a fixed set of vertices and edges joining those vertices. The polygon's vertices are typically stored in the application data structure. The scene designer will construct an object one polygon at a time, and then define the various attributes for that polygon at each of its vertices. Any number of attributes may be defined at a vertex including color, specular color, alpha (translucency), fog, surface texture and z (depth). The vertex attributes must eventually be interpolated to each pixel contained in the polygon in a process commonly referred to as scan conversion or rasterization. Currently, available rasterizers use a windower in conjunction with either an interpolator, multiplier or incrementer for interpolating all of the polygon vertex attributes to generate the attribute values at each pixel contained within the polygon. The function of the windower is to traverse the area of the polygon in a way that is guaranteed to visit all the pixels internal to it. Being assured that all the pixels inside the polygon will be visited by the windower, attribute values defined at the vertices are then interpolated to each pixel in the polygon. The polygon can be traversed by any algorithm that is guaranteed to cover all the pixels, and many techniques have been suggested in the prior art, however, most suffer from the limitation of being inefficient in their approach thereby necessitating excessive computational time. An additional drawback associated with inefficient traversal algorithms is the requirement that the interpolation hardware carry additional precision to compensate for overshoot and retrace of the graphics primitive. Representative examples of prior art traversal algorithms can be found in *A Parallel Algorithm for Polygon Rasterization*, Juan Pineda, Apollo Computer Inc., Siggraph '88 Atlanta, Computer Graphics, Volume 22, Number 4, August 1988. A further drawback associated with conventional interpolation methods involves the added costs associated with using interpolators that have the capability of multiplying. Conventional interpolation methods sometimes require that during the process of traversing or walking the face of a polygon a jump may be required to some random location on the face. To execute the required jumps, a multiplication operation is required of the interpolator. The hardware costs of multiply capable interpolators is greater than the cost of interpolators without such a feature.

Accordingly, there is a need to provide an efficient, accurate and inexpensive method and apparatus for rasterizing triangle primitives from descriptions that define x, y coordinates of three vertices, and several attributes per vertex such as color, specular color, depth, and texture coordinates.

SUMMARY OF THE INVENTION

Accordingly, it is an object of the present invention to provide an efficient, accurate method for rasterizing triangle primitives.

Another object of the present invention is to provide an efficient rasterizer that can interpolate multiple non-perspective correct attributes at the clock rate.

Yet another objective of the present invention is to provide a cost-effective rasterizer that can utilize cost-effective hardware, requiring the minimum number of gates, to interpolate multiple non-perspective correct attributes at the clock rate.

A still further object of the present invention is to provide an accurate rasterizer requiring the minimum number of bits of precision per attribute.

These and other objects of the present invention are achieved by a low cost, highly efficient rasterizer that is essentially comprised of a bounding box calculator, a plane converter, a windower, and incrementers. The rasterizer interpolates multiple non-perspective correct vertex attributes at the rate of one new pixel per pipeline clock. The polygon vertex attributes to be interpolated may include, but are not restricted to, color, specular color, alpha, fogging, depth, and texture coordinates. In general, the rasterizing process operates on m by n pixel blocks or spans, where m and n can be any integer value within the parameters of the display area. The preferred embodiment, however, equates m and n to four. For each polygon to be processed, a bounding box calculation is performed which determines the display screen area, in spans, that totally encloses the polygon. The bounding box calculator computes both the vertical and horizontal extent, in spans, for the area enclosing the polygon. The bounding box horizontal and vertical boundaries are passed along to the plane converter. The plane converter also receives as input attribute values for each vertex of the polygon. The plane converter computes planar coefficients (Cx,Cy and Co) for each attribute of the polygon for each of the edges of the polygon. The coefficients, Cx and Cy, represent the rate of change or gradient, for each polygon attribute in the x and y directions, respectively. The plane converter computes the start pixel center location at a start span and a starting coefficient value at the pixel center, Co. The plane converter also computes line coefficients, Lo, Lx, and Ly for each of the three edges of each triangle. Line equation values, Lo, Lx, and Ly are passed through to the windower where further calculations, internal to the windower, allow the windower to determine which spans are either covered or intersected by the polygon. The incrementers receive the span coverage data from the windower in addition to receiving planar coefficient values from the plane converter. The incrementers utilize the data from both the windower and plane converter to walk or traverse the polygon in those intersected spans, pixel by pixel. As the incrementer visits each pixel, vertex attribute values are interpolated to each pixel by simply adding a constant fixed-point number, Cx or Cy, in either the horizontal or vertical direction respectively. The ability to always be able to perform simple fixed point additions or subtractions significantly reduces the interpolation hardware costs as a consequence of never being required to perform multiplies.

DETAILED DESCRIPTION OF THE PREFERRED EMBODIMENTS

Figure 1:
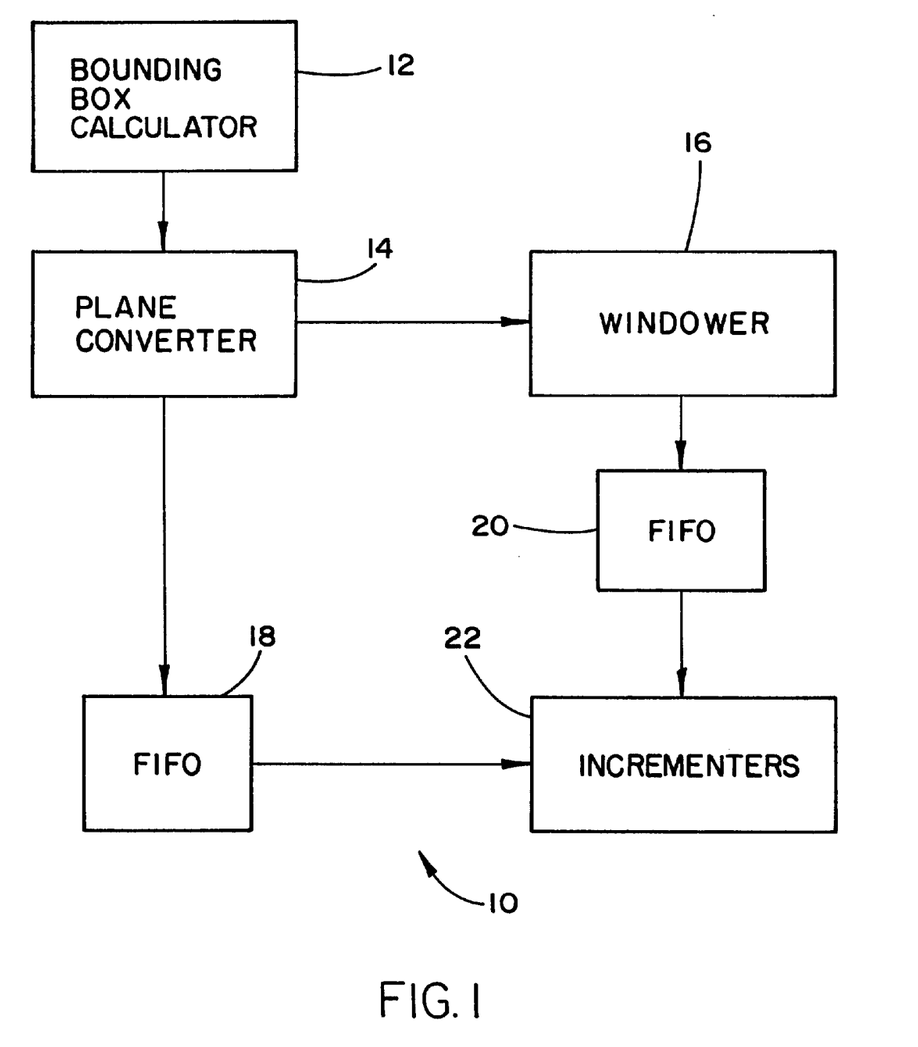
FIG. 1 illustrates a functional block diagram of the present invention.

FIG. 1 is a block diagram of a preferred embodiment of the invention. In this embodiment, a rasterizer 10 comprises a bounding box calculator 12, a plane converter 14, a windower 16, FIFO 18, FIFO 20, and one of several Incrementers 22. For each polygon to be processed, a bounding box calculation is performed which determines the display screen area, in spans, that totally encloses the polygon. The bounding box calculator 12 computes both the vertical and horizontal extent, in spans, for the area enclosing the polygon. The bounding box horizontal and vertical boundaries are passed along to the plane converter 14.

The plane converter 14 also receives as input attribute values for each vertex of the polygon. The plane converter 14 computes planar coefficients (Cx, Cy and Co) for each attribute of the polygon, including the edges. The three planar coefficients consist of a starting attribute value at the pixel center, Co, and gradient values in both the horizontal and vertical directions, Cx and Cy respectively. In addition the plane converter 14 also computes three line coefficients, Lo, Lx and Ly which are output to the windower 16 for each edge of the triangle. The line equation values are used in further calculations to allow the windower 16 to determine which spans are either covered or intersected by the polygon.

The three planar coefficients (Cx, Cy and Co) are output to FIFO 18 for each vertex attribute associated with the vertex. The attributes are all assumed to be planar, in that both the horizontal and vertical increments will be constants. Thus, the attributes values can be calculated for any pixel on the screen by simply adding or subtracting multiples of Cx and/or Cy as the interpolation hardware (incrementers) walks the polygon, pixel by pixel, by always performing a simple fixed point add operation.

FIFO 20 serves to decouple the windowing process from the incrementing process. A nonfixed delay is implemented with FIFO 20 between the two units. Because the incrementers 22 require more time to complete the processing of a span than the time taken by the windower 16 to initially determine whether that span was valid, it is desirable to only send valid span data to the incrementers to best utilize their processing power. The FIFO 20 enables the windower 16 to withhold data from being sent to the incrementers, by not writing invalid span data into the FIFO. The windower 16 can thereby avoid telling the incrementers to visit those spans which lie entirely outside the triangle, invalid spans, and save the associated processing overhead.

The incrementers 22 receive the span coverage data from the windower in addition to receiving planar coefficient values from the plane converter. The incrementers 22 utilize the data from both the windower 16 and plane converter 14 to walk or traverse the polygon in those intersected spans, pixel by pixel. As the incrementer 22 visits each pixel, vertex attribute values are interpolated to each pixel by simply adding a constant fixed-point number, Cx or Cy, in either the horizontal or vertical direction respectively.

Figure 2:
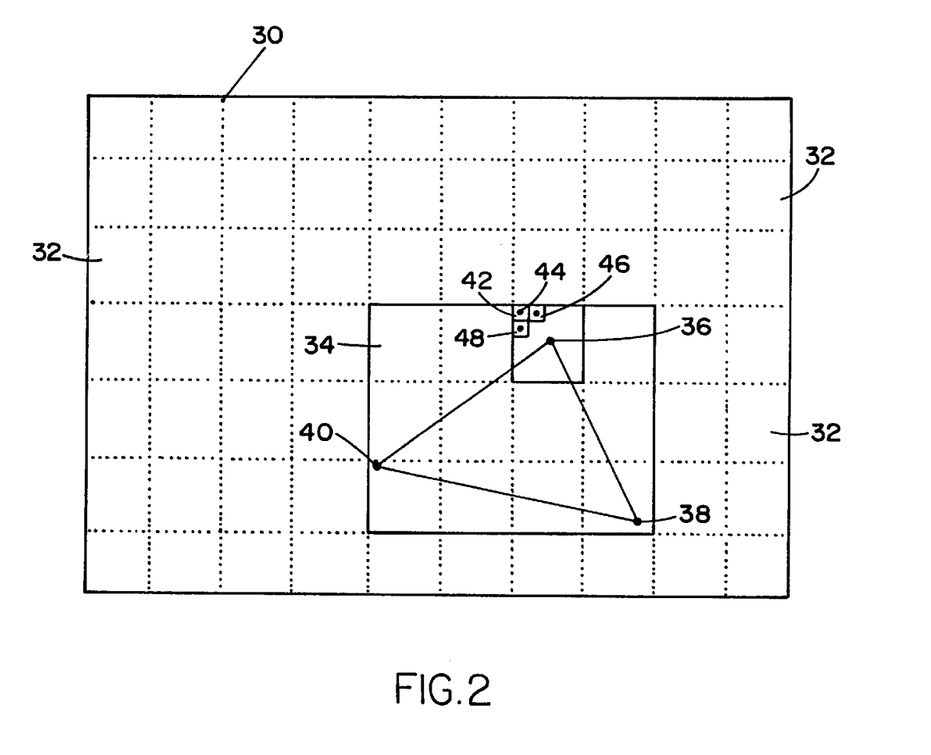
FIG. 2 illustrates an example of the bounding box calculation.

FIG. 2 illustrates an example of the result of a bounding box calculation for the triangle depicted. There is shown in FIG. 2 a screen 30 divided in a plurality of spans 32. Spans are a predefined group of pixels, such as 4×4. Usually, a span is of a rectangular or square shape. The bounding box 34, in this example, defines an area four spans 32 in width by three spans 32 in height. The boundaries in spans of the bounding box 34 were determined by the three vertices 36, 38 and 40 which define the polygon. The bounding box calculator 12 receives as input a list of the polygon's vertices, along with the attribute values associated with each vertex and the (x, y) vertex positions. The (x, y) vertex positions are used to determine the horizontal and vertical extent, in spans, of the area enclosed by the polygon. The horizontal extent of the bounding box can vary anywhere from one to the maximum number of span columns per line. The vertical extent can vary anywhere from one to the maximum number of span rows per frame. The boundary box calculation includes determining an upper and lower horizontal boundary and a left and right vertical boundary, said upper and lower horizontal boundaries being determined by evaluating the y coordinates for each x, y vertex pair of the primitive and selecting the vertex pairs which correspond to a maximum and minimum value of y, and said left and right vertical boundaries being determined by evaluating the x coordinates for each x, y vertex pair of the primitive and selecting those vertex pairs which correspond to a maximum and minimum value of x.

Output data from the bounding box calculator 12 is supplied to the plane converter 14. The plane converter 14 is a micro-coded floating point unit which receives as input from the bounding box calculator 12 attribute values for each vertex of the polygon. The plane converter 14 computes three planar coefficients (Co, Cx, Cy) for each vertex attribute in addition to three starting point line coefficients (Lo, Lx, Ly) for each of the three edges of the polygon.

The start value, Co, describes the attribute value at a reference point, which in a preferred embodiment, is the center of the upper left corner pixel in the span containing the top most vertex. In the example shown in FIG. 2, pixel 42 having center 44 meets this criteria. The horizontal gradient, Cx, describes the change in that attribute from the reference point 44 to its value one pixel to the right pixel 46. The vertical gradient, Cy, describes the change in that attribute from the reference point to its value one pixel below pixel 48. The attributes are all assumed to be planar, in that both the horizontal and vertical increments will be constants. Thus, the attribute values can be calculated for any pixel on the screen by simply adding or subtracting multiples of Cx and/or Cy.

The planar coefficient calculation utilizes Cramer's Rule, which solves for three equations in three unknowns, to generate three planar coefficients for each vertex attribute. The three planar coefficients consist of a starting attribute value at the pixel center, Co, and gradient values in both the horizontal and vertical directions, Cx and Cy respectively. The Cx and Cy coefficients are determined by the application of Cramer's rule. If we define $\Delta x_1$, $\Delta x_2$, $\Delta x_3$ as the horizontal distances from the three vertices to the "reference point" (center of the pixel in upper left corner of the span containing the top-most vertex, shown as 42), and $\Delta y_1$, $\Delta y_2$, and $\Delta y_3$ as the vertical distances, we have three equations with three unknowns. The example below shows the red color components (represented as red1, red2 and red3, at the three vertices):

$$Co_{red} + Cx_{red}*\Delta x_1 + Cy_{red}*\Delta y_1 = red_1 \text{ for vertex 36}$$

$$Co_{red} + Cx_{red}*\Delta x_2 + Cy_{red}*\Delta y_2 = red_2 \text{ for vertex 38}$$

$$Co_{red} + Cx_{red}*\Delta x_3 + Cy_{red}*\Delta y_3 = red_3 \text{ for vertex 40}$$

The determinant of this system is:

$$D = \begin{vmatrix} 1 & \Delta x_1 & \Delta y_1 \\ 1 & \Delta x_2 & \Delta y_2 \\ 1 & \Delta x_3 & \Delta y_3 \end{vmatrix}$$

The coefficients $Co_{red}$, $Cx_{red}$, and $Cy_{red}$ can be calculated in the following manner:

$$Co_{red} = \frac{\begin{vmatrix} red_1 & \Delta x_1 & \Delta y_1 \\ red_2 & \Delta x_2 & \Delta y_2 \\ red_3 & \Delta x_3 & \Delta y_3 \end{vmatrix}}{D}$$

$$Cx_{red} = \frac{\begin{vmatrix} 1 & red_1 & \Delta y_1 \\ 1 & red_2 & \Delta y_2 \\ 1 & red_3 & \Delta y_3 \end{vmatrix}}{D}$$

$$Cy_{red} = \frac{\begin{vmatrix} 1 & \Delta x_1 & red_1 \\ 1 & \Delta x_2 & red_2 \\ 1 & \Delta x_3 & red_3 \end{vmatrix}}{D}$$

The plane converter 14 also calculates the starting point line coefficients, Lo, Lx, and Ly for each of the three edges of the polygon. Lx describes the change in distance, for the pixel 46 located at the immediate right of reference pixel 44. Ly describes the change in distance for the pixel 48 immediately below the reference pixel 44. In the illustrative embodiment a perpendicular distance is calculated, however, other distance measures may be implemented including Manhattan distance. These values are planar values, so the distance to the edge can be calculated for any pixel on the screen by adding or subtracting multiples of Lx and/or Ly.

Lo represents, for each of the three edges, the perpendicular, or other well known measure of distance from an edge to a selected reference pixel 42. Lo is determined for edge 36–38 by choosing the top-most vertex, vertex 36 of FIG. 2, and solving for Lo at the reference pixel 42, whose center 44 is defined as $X_{ref}$, $Y_{ref}$, by the following equation:

$$Lo = Lx^*(X_{Ref} - X_{vert}) + Ly^*(Y_{ref} - Y_{vert}) \qquad \text{Eq. 1}$$

Where, $$Lx = -(\text{delta } y)/|\text{length\_of\_edge}| \qquad \text{Eq. 2}$$

and, $$Ly = (\text{delta } x)/|\text{length\_of\_edge}| \qquad \text{Eq. 3}$$

and, $X_{vert}$=X coordinate of vertex 36

$Y_{vert}$=Y coordinate of vertex 36

Delta x is calculated by taking the absolute value of the difference between both vertices' (36 and 38) x coordinates. Delta y is similarly calculated by taking the absolute value of the difference between both vertices' (36 and 38) y coordinates. These values, delta x and delta y, are used in the computation of Lx and Ly respectively.

Figure 3A:
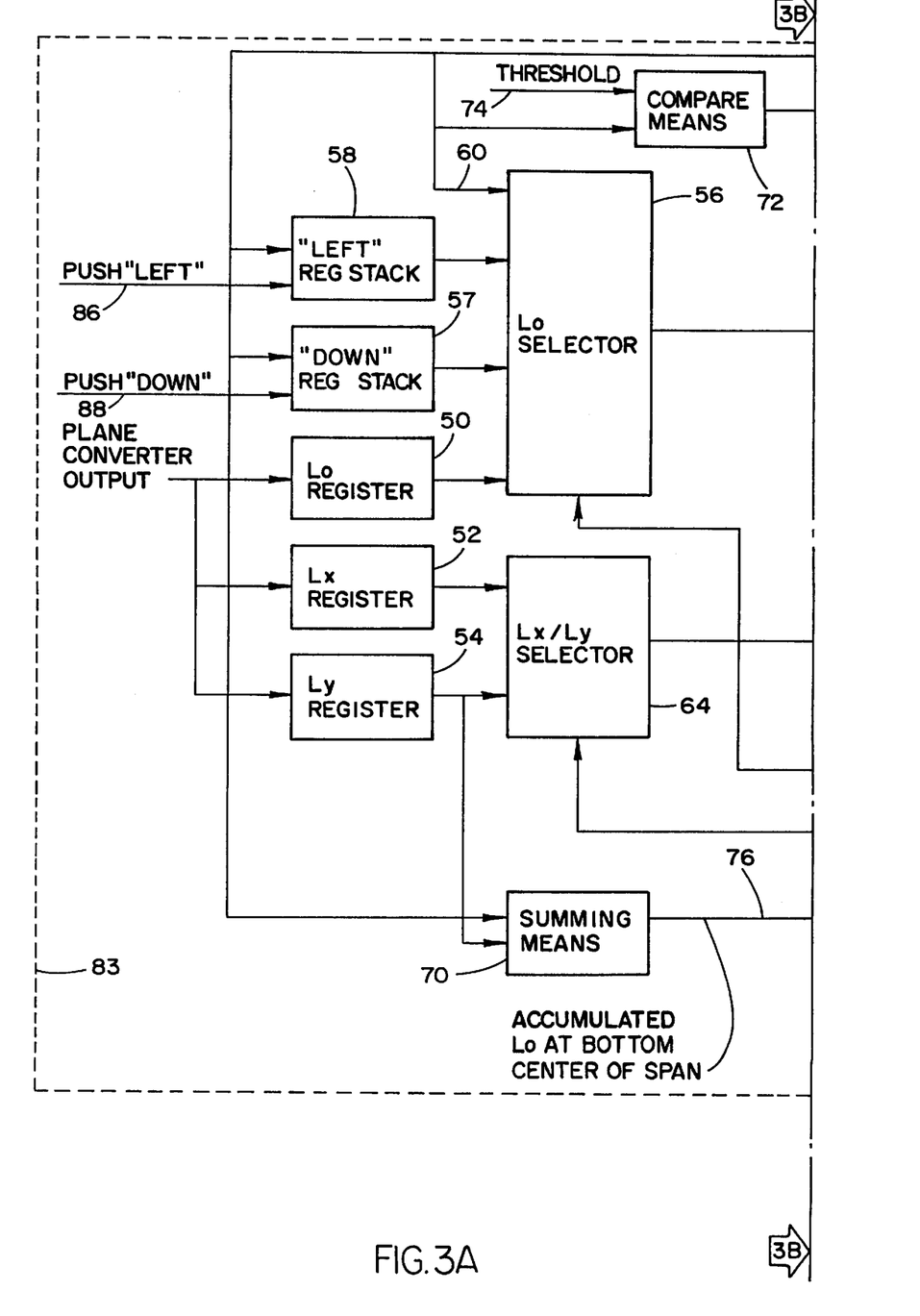
FIGS. 3A and 3B illustrates the windower hardware
Figure 3B:
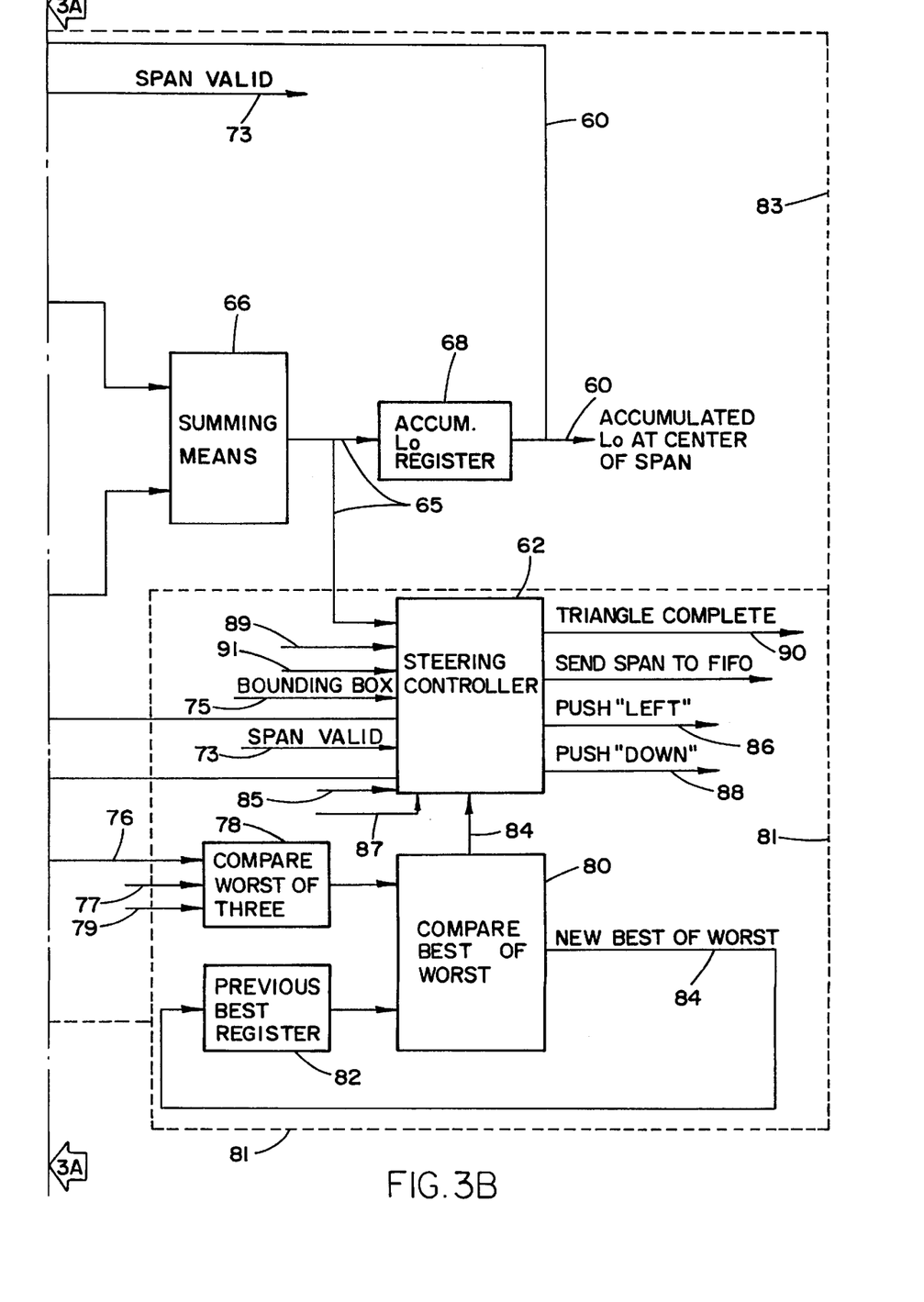

FIGS. 3A and 3B are block diagrams of the windower 16 which recalculates the value of the distance measure, Lo for all three edges of each polygon at multiple points in each span "visited" during the windowing process. Values for Lo, Lx, and Ly are stored in Lo Register 50, Lx Register 52, and Ly Register 54, respectively. Lo Selector 56 selects between the new triangle's Lo, the contents of the Down Register Stack 57, the Left Register Stack 58 or the Accumulated Lo at Center of Span 60, under control of the Steering Controller 62. The selected value of Lo is then summed with the output of the Lx/Ly Selector 64 by the Summing Means 66. The result, 65, goes both to the Accumulated Lo Register 68 and the Steering Controller 62. The Accumulated Lo Register 68 holds the current value of Accumulated Lo at the Center of Span 60, which is routed to the two register stacks 57 and 58, another summing means 70, and a compare means 72. The Threshold value 74 is the distance from the center of a span to an edge entirely outside of the span, and is compared by compare means 72 to the Accumulated Lo at Center of Span 60 to determine if the span is valid 73. The Steering Controller 62 receives this signal 73, and also continuously compares the current span's X and Y values to Bounding Box values 75 received from plane converter 14 to determine whether to send a span's information to the FIFO 20. The Summing Means 70 adds 2*Ly to the Accumulated Lo at Center of Span 60 to create the Accumulated Lo at Bottom Center of Span 76. Inputs 77 and 79 are Accumulated Lo at Bottom of Span for the other two edges of the triangle that are being calculated by identical circuitry (50–74) not shown. A complete circuit of the windower of the present invention consists of one copy of the portion of the circuit within dashed line 81 and three copies of the circuitry within dashed line 83. Inputs 85 and 87 into steering controller 62 provide span valid data that are similarly calculated from the other two edges of the triangle calculated from the two other copies of the circuitry in dashed line 83, not shown. Also lines 89 and 91 are input to steering controller 62 from the two other copies of the circuitry 83.

The Compare Worst of Three 78 examines the Accumulated Lo at Bottom Center of Span for all three edges of the triangle, and selects the worst Lo. The Compare Best of Worst 80 compares the output with the Previous Best Register 82 value, and selects the New Best of Worst 84, and indicates this selection to the Steering Controller 62. Thus, the Steering Controller 62 can determine when to Push Left 86, Push Down 88, which direction to scan (as controlled by the selection on the Lx/Ly Selector" 64), and when the Triangle is Complete 90.

Figure 4:
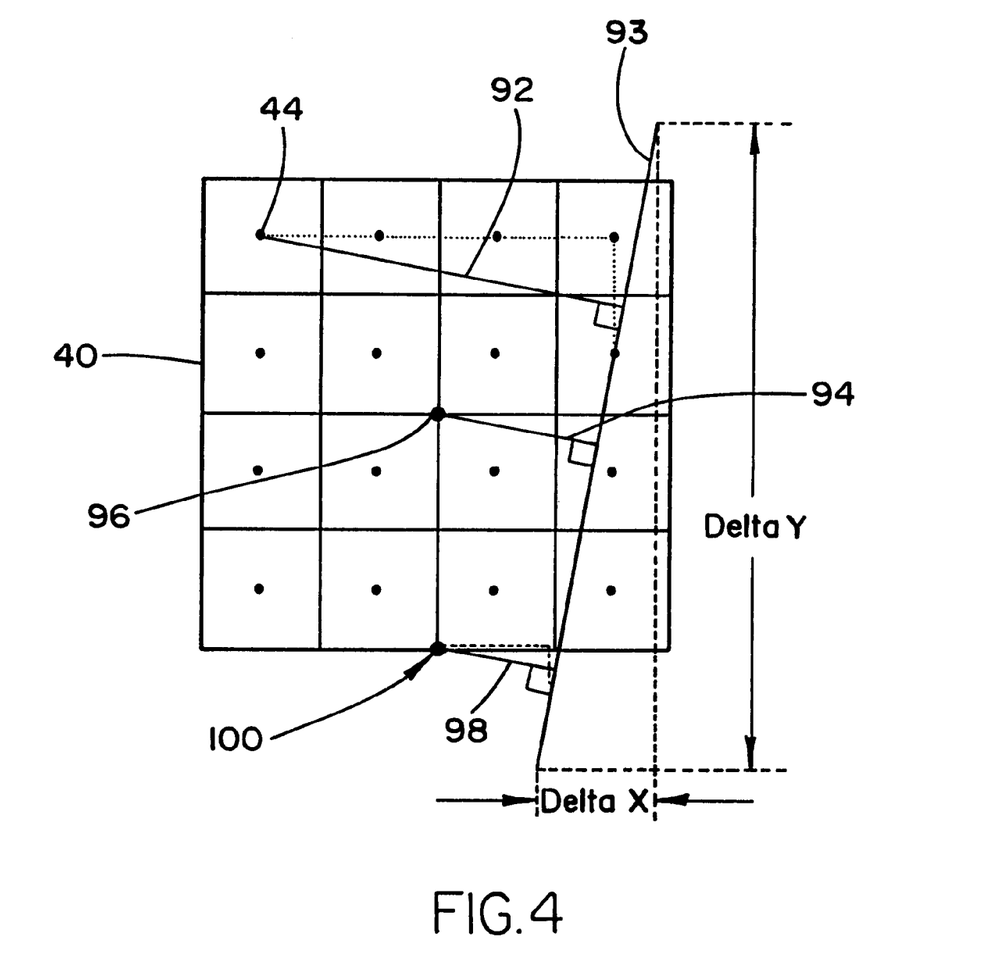
FIG. 4 illustrates a representative span to describe the line equation calculations performed by the windower.

FIG. 4 illustrates the two points in a span at which the windower 16 recalculates the edge perpendicular distance Lo for an edge 93 of the polygon. Distance 92 is the Lo Calculated by plane converter 14 at the reference pixel center 44. The distance 94 is the distance Lo at the center of the span 96. Distance 98 is the distance Lo at the bottom center of the span 100. Eq.'s 1, 2 and 3 above are used to calculate the Lo distances. The values are utilized by the windowing algorithm to determine if the span is either covered or intersected by the polygon currently being processed. Each edge perpendicular distance of Lo 92, 94, 96 is updated when the windower moves to an adjacent span by adding four times the horizontal gradient, 4*Lx, when moving to the right, and subtracting four times the horizontal gradient when moving to the left. When moving down, four times the vertical gradient, 4*Ly, is added. With fixed point values, multiplying by four is equivalent to a left shift of two places.

In the preferred embodiment the windower 16 was designed to start at a point on the screen and walk or traverse the polygon while minimizing the time spent outside the boundaries of the polygon. The windower algorithm is designed to move from a starting pixel center location and walking the polygon in such a way to allow the incrementers 22 to always perform a simple fixed point add operation, stepping a fixed increment, Cx, when stepping in the x-direction, or by a fixed increment, Cy, when stepping in the y-direction.

The windower 16, in a preferred embodiment, operates on spans four pixels wide by four pixels high. By dividing the screen into spans of 4 by 4, the windower 16 runs faster than the per pixel incrementers downstream. Processing spans instead of individual pixels reduces the complexity of the hardware in the subsequent processing stages, because less hardware needs to be configured in parallel in the interpolating stage. The windower 16 determines which spans are either covered or intersected by the triangle primitives, and sends this information to the incrementers 22. This information is critical to the windowing process in that the windower 16 only spends processing time in those regions of the display area (those spans) which contribute to the area of the triangle.

FIFO 20 serves to decouple the windowing process from the incrementing process. A nonfixed delay is implemented with FIFO 20 between the windower 16 and the incrementers 22. Because the incrementers 22 require more time to complete the processing of a span than the time taken by the windower 16 to initially determine whether that span is valid, it is desirable to only send valid span data to the incrementers 22 to best utilize their processing power. The FIFO 20 enables the windower 16 to withhold data from being sent to the incrementers 22, by not writing invalid span data into the FIFO 20. The windower 16 can thereby avoid telling the incrementers 22 to visit those spans which lie entirely outside the triangle, invalid spans, and save the associated processing overhead.

In the preferred embodiment, the windower 16 walks the polygon in either a vertical or horizontal direction, with a step size of 4 pixels, to allow the incrementers to simply add 4 times the gradient value in that direction. The hardware requirements are thereby simplified requiring only a binary shift by 2 for fixed point numbers. The windower 16 has the additional capability of marking any spot it visits on the polygon, and later, jumping back to that spot. The jump back capability is implemented through the addition of a stack to the incrementers thereby requiring less costly interpolation hardware without the need to be multiply capable. In addition to determining only those spans of interest the windower 16 also determines which pixels are covered inside those spans of interest.

Figure 5A:
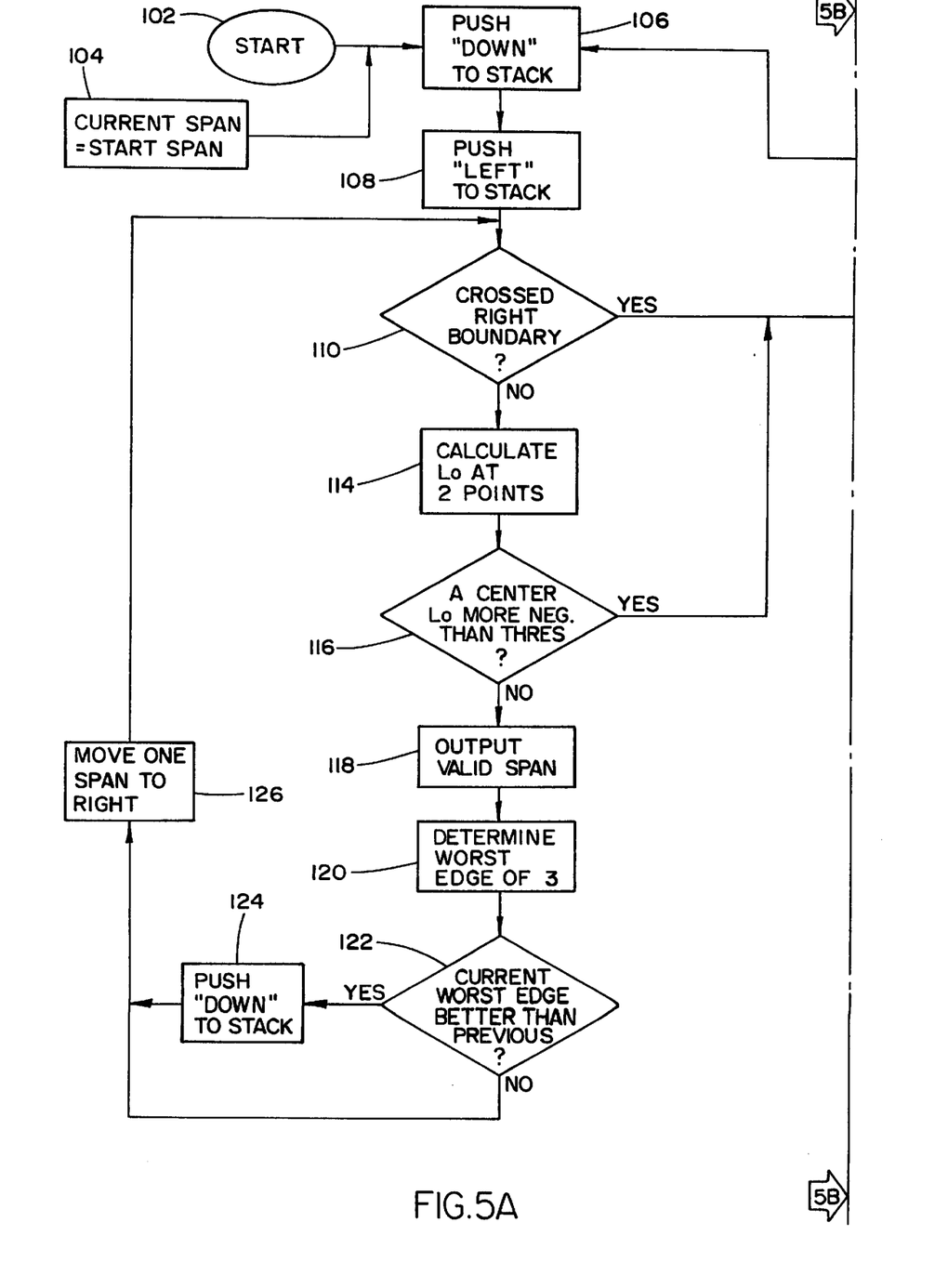
FIGS. 5A and 5B illustrates a detailed flowchart of the windowing algorithm.
Figure 5B:
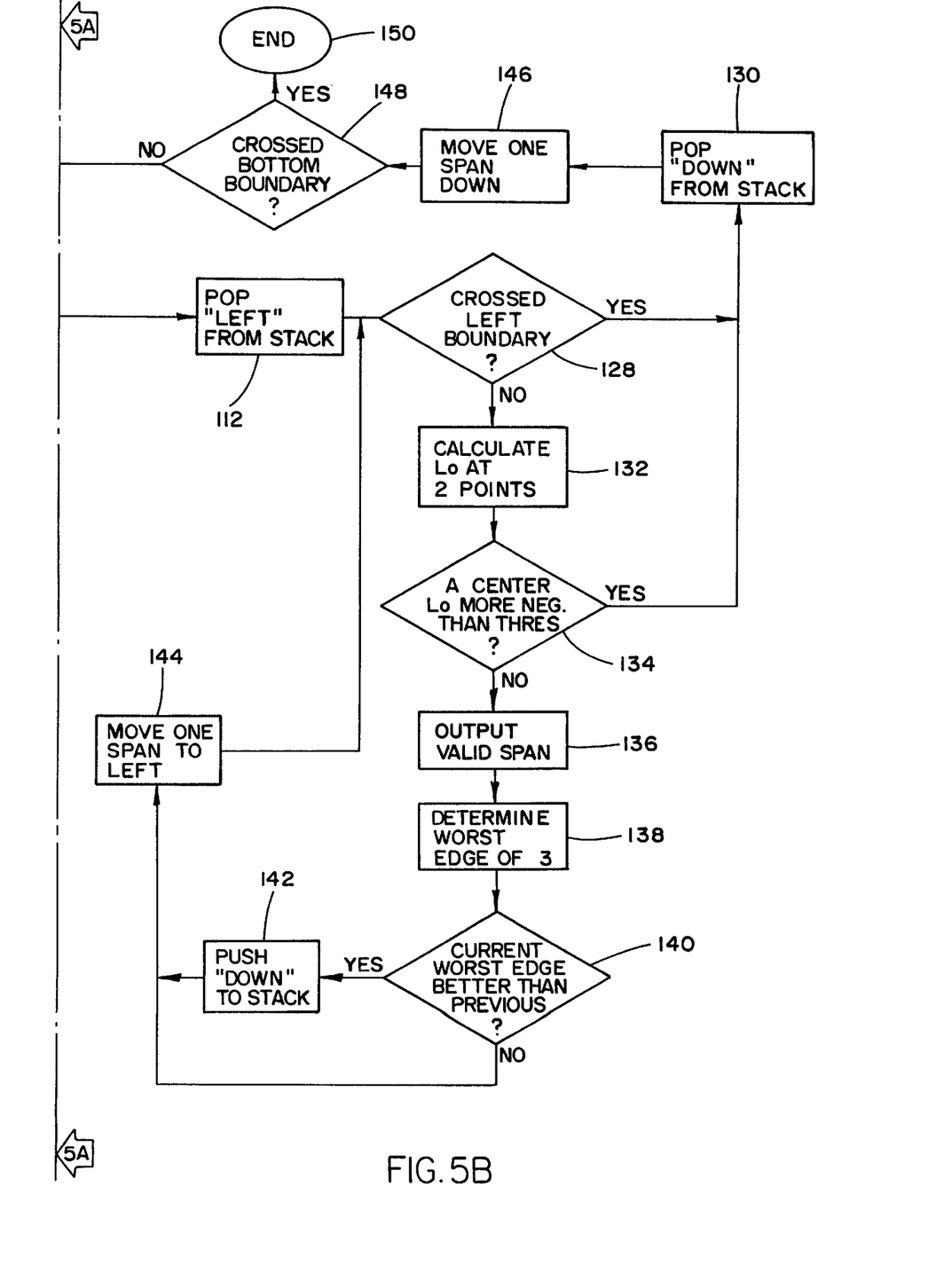

FIGS. 5A and 5B are the detailed flowcharts which describe the windowing algorithm. The algorithm operates by starting in a span containing the topmost vertex of the polygon. The span is determined by evaluating the y-coordinate for each of the x, y vertex pairs of said primitive and selecting the span that contains the x, y vertex pair of the primitive whose y-coordinate is minimum. The algorithm, walks the polygon first in a horizontal direction moving to the right, span by span, until the edge of the polygon is reached. When the edge of the polygon is reached the algorithm walks horizontally to the left in that same span row. As the algorithm walks horizontally in each direction it determines and stores the optimum span from which to move down from to the next horizontal span row covered by the polygon. As each span is visited by the algorithm line coefficient values, Lo, are interpolated to each pixel contained in the span.

The detailed steps of the windowing algorithm are as follows. The algorithm always starts at 102 in the span containing the top-most vertex, start span 104. The Lo values for each edge of the polygon are calculated in the start span 104 as described by equations 1, 2, and 3. The windower 16 saves the starting span position in two hardware registers, referred to as a Down register and the Left register at steps 106 and 108 respectively. The register values will be updated to reflect the movement of the windowing algorithm as it walks the polygon. The register stores the current span (x, y) position, and the current value of Lo. Similar registers in the incrementers 22 store the current value of Co for all vertex attributes (including, but not limited to face color red, green, and blue, specular color red, green, and blue, alpha, fog, and Z).

At decision step 110, the windower 16 determines whether it has already crossed the right boundary of the polygon in the span row as determined by calculations performed by the Bounding Box Calculator 12 (maximum span x value). If step 110 is true, the right boundary was crossed and the windower 16 then branches to step 112 to start the process of moving left in that span row. If step 110 is false, the windower will recalculate the three Lo values at two points in the current span, the center and the bottom center of the current span, at step 114. Given that there may be some number of spans in a span row which contain no polygon coverage but are contained inside the bounding box, step 116 is a decision step to determine whether the current span is entirely outside the polygon. If all three Lo values computed at the center of the span are positive, the center of the span is entirely within the polygon. If one or more Lo values are negative, the span center is outside the triangle, and if one or more Lo values are negative, and larger in magnitude than a threshold value, the entire span is guaranteed to be outside the triangle, causing a branch to step 112. When the entire span is guaranteed to be outside the triangle the windower 16 stops scanning to the right. If the span is not entirely outside the triangle the windower 16 will continue scanning to the right by outputting a valid span, at step 118, to FIFO 20, indicating which of the 16 pixels in the current span are covered by the polygon. The windower 16 must also determine the optimum span in the current span row from which to move down from to repeat the process steps. The determination is based on a comparison test at step 120 which calculates, for the current span, which of the three edges of the current polygon is the "worst". This "worst" test compares the Lo's calculated at the bottom center of the span for the three edges, and selects the most negative of the three Lo values. The Lo value thus chosen is compared at step 122 with the previous span's "worst" Lo value, and the more positive of these two is retained for future compares and represents the current best choice span to move down from. If the more positive of the two "worst" Lo values was associated with the current span, the data associated with that span including its (x, y) location, the three Lo values, and in similar registers in the incrementers all Co values replace the data currently stored in the "Down" hardware register, step 124. Otherwise the "Down" hardware register values are retained and the windower 16 continues to step 126 and moves one span to the right. The process is repeated for the next span to the right at decision step 110 where the windower 16 again determines whether the last movement has caused the "current span" to be located outside the bounding box. This cycle continues, moving one span to the right until either step 110 or step 116 causes the windower 16 to branch to step 112.

Branching to step 112 indicates that movement to the right has terminated for that span row and the process will be repeated by moving one span to the left. Left movement begins by retrieving the current span contained in the "Left" hardware register and labeling it the new "current span" at step 112. Similar to the process steps performed for right movement, at step 128 the windower 16 determines whether it has already crossed the left boundary as determined by the Bounding Box Calculator 12 (minimum span X value). If step 128 is true, the windower 16 has crossed the left boundary and a branch is taken to step 130. If step 128 is false, the windower will recalculate the three Lo values at two points in the span, the center and the bottom center of the span, at step 132. Step 134 is a decision step to determine whether the span is entirely outside the triangle. If all three Lo values computed at the center of the span are positive, the center of the span is entirely within the triangle. If one or more Lo values are negative, the span center is outside the triangle. If one or more Lo values are negative, and larger in magnitude than a threshold value, the entire span is guaranteed to be outside the triangle, causing a branch to step 130. When the entire span is determined to be outside the triangle the windower 16 stops scanning to the left. If the span is not entirely outside the triangle the windower 16 will continue scanning to the left by outputting a valid span, at step 136. In step 138 the windower 16 determines, for the current span, which of the three edges of the current triangle is the "worst". This test compares the Lo's calculated at the bottom center of the span for the three edges, and selects the smallest (most near negative infinity) of the three. The Lo value thus chosen is compared at step 140 with the previous span's "worst" Lo value, and the better (most near positive infinity) of these two is retained for future compares. If the current "worst" Lo value was determined to be better than the previous span's similar value, the current span (its location, Lo, and in similar registers in the incrementers all Co values) are stored on the "Down" stack in step 142. Otherwise the windower 16 continues to step 144 and moves one span to the left. The next step is 128 where the windower 16 again determines whether the last movement has caused the "current span" to be located outside the bounding box. This cycle continues, scanning left, until either step 128 or step 134 causes the windower 16 to branch to step 130.

In step 130 the last value placed on the "Down" stack is "popped" from the stack, and becomes the new "current span." In step 146 the windower 16 moves one span downward. Step 148 is a decision test to determine if the current span is below the bottom boundary (maximum span Y value) as determined by the Bounding Box 12. If step 148 is false, the windower 16 branches to step 106 and continues the scanning process. If step 148 is true, the windower 16 branches to step 150, and concludes the scanning process for this triangle.

Figure 6:
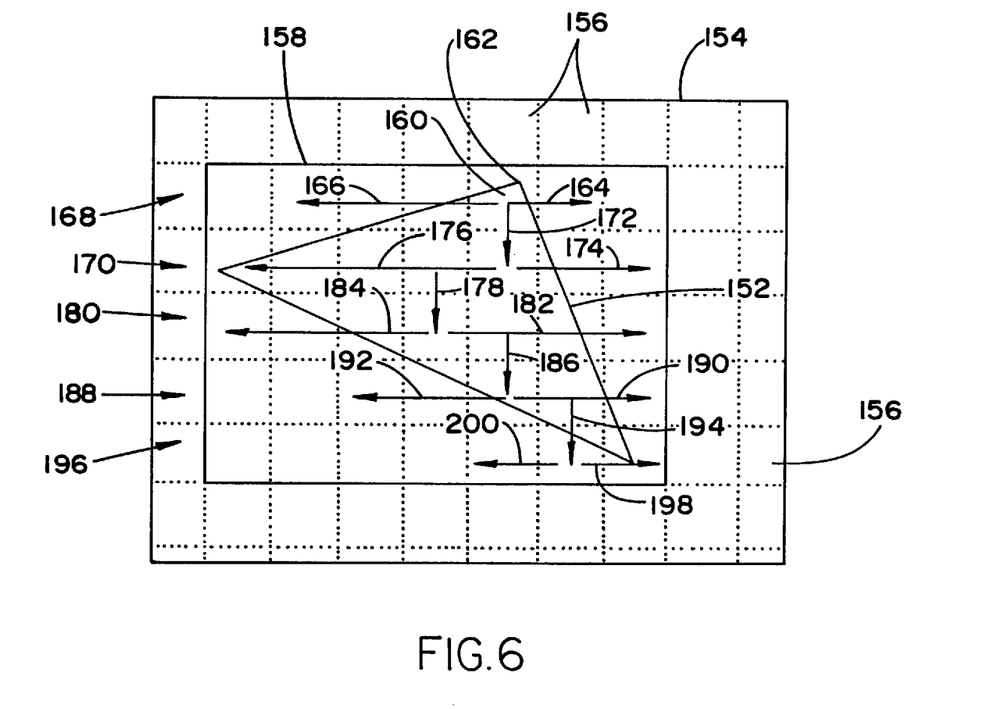
FIG. 6 illustrates an example of how the method would walk the representative triangle.

FIG. 6 illustrates how the windower algorithm described in connection with the flow chart of FIG. 5 would walk through a polygon 152 depicted in screen 154, divided in spans 156. The polygon is first determined to be within bounding box 158. The algorithm starts in a span 160 containing the upper most vertex 162 of the polygon 152 and walks the polygon, span by span, first in a horizontal direction, proceeding right (arrow 164) then left (arrow 166). As it walks from right to left in the first horizontal span row 168 it performs the calculations in each visited span 156 to determine the optimum point from which to descend to the next horizontal row 170, illustrated by arrow 172. The process of walking right then left and deciding an optimum point from which to descend is repeated in each horizontal span row until the lowest span row is reached containing the bottom most vertex of the polygon. The walking continues in the following order of the arrows: for Row 170, arrows 174, 176, 178; for Row 180, arrows 182, 184, 186; for Row 188, arrows 190, 192, 194 and for Row 196, arrows 198, 200.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new and desire to secure by Letters Patent is:

1. A method for performing a two dimensional interpolation of a plurality of vertex attributes of a primitive displayed by a plurality of pixels of a display, the display being comprised of a plurality of spans organized in a matrix of columns and rows, each span consisting of a grouping of pixels, the method comprising the steps of:
   a) determining a bounding box of spans enclosing the primitive in two dimensions;
   b) determining a start span within said bounding box;
   c) generating at said start span planar coefficients for each attribute of the primitive, and a starting point line coefficient for each edge of the primitive;
   d) determining each span within said bounding box containing at least one pixel potentially covered by the primitive in response to said starting point line coefficients;
   e) determining each pixel covered by the primitive within each span determined in step d); and
   f) at each pixel determined in step e) interpolating attribute values of said plurality of vertex attributes in response to said planar coefficients.

2. The method of claim 1, wherein the step of determining a bounding box at step a) includes determining an upper and lower horizontal boundary, and a left and right vertical boundary, said upper and lower horizontal boundaries being determined by evaluating the y coordinates for each x, y vertex pair of the primitive and selecting the vertex pairs which correspond to a maximum and minimum value of y, and said left and right vertical boundaries being determined by evaluating the x coordinates for each x, y vertex pair of the primitive and selecting those vertex pairs which correspond to a maximum and minimum value of x.

3. The method of claim 1, wherein the step of determining a start span at step b) further includes evaluating the y-coordinate for each of the x, y vertex pairs of said primitive and selecting the span that contains the x, y vertex pair of the primitive whose y-coordinate is minimum.

4. The method of claim 1, wherein the step of generating planar coefficients in step c) comprises:
   1) determining a reference pixel in the start span;
   2) computing a starting attribute at the reference pixel for each of said plurality of vertex attributes;
   3) computing a first gradient value at the reference pixel for each of said plurality of vertex attributes in a first dimension; and
   4) computing a second gradient value at the reference pixel for each of said plurality of vertex attributes in a second dimension.

5. The method of claim 4, wherein step 1) further includes locating the center of the upper left corner pixel in the start span.

6. The method of claim 4, wherein steps 2), 3) and 4) include determining the horizontal and vertical distances from each of said plurality of vertices to the reference point and by solving three equations in three unknowns.

7. The method of claim 4, wherein the first gradient value is a horizontal gradient, and the second gradient value is a vertical gradient.

8. The method of claim 4, wherein the step of calculating starting point line coefficients for each edge of the primitive is performed at the reference pixel of the start span.

9. The method of claim 8, wherein the step of calculating starting point line coefficients includes calculating a first coefficient, Lo, representing a distance from the reference pixel to an edge of the primitive, and calculating coefficients Lx and Ly which represent a change in distance from the reference pixel to pixels to the right and below the reference pixel, respectively.

10. The method of claim 9, wherein the Lo, Lx, and Ly coefficients represent perpendicular distances.

11. The method of claim 9, wherein the Lo, Lx, and Ly coefficients represent Manhattan distances.

12. The method of claim 8, wherein step d) of claim 1 includes;
   a) determining each span at least partially covered by the primitive in one direction in a first span row containing the start span;
   b) determining each span at least partially covered by the primitive in the opposite direction in the first span row containing the start span;
   c) defining the optimum span from which to move down to a second span row;
   d) moving down to a second span row from the optimum span to a second start span vertically contiguous with the optimum span;
   e) determining each span at least partially covered by the primitive in one direction in the second span row;
   f) determining each span at least partially covered by the primitive in the opposite direction in the second span row; and
   g) repeating steps c)–f) for subsequent span rows until all spans covered by the primitive have been determined.

13. The method of claim 12, wherein step c) includes recalculating said starting point line coefficients for each edge of the primitive at two reference points in each span at least partially covered by said primitive in each span row, and comparing the line coefficients for each span in each span row to define the optimum span.

14. The method of claim 13, wherein the reference points are a center point and a bottom center point of each span.

15. The method of claim 1, wherein step d) further includes:
   a) recalculating values of edge distance, Lo, at the center point and the bottom center point in the start span;
   b) saving the start span value, Lo, for each edge, in a first and a second hardware register;
   c) moving one span to the right to a current span unless movement results in placement outside the boundaries of the bounding box;
   d) calculating values of Lo for each edge at the center point and the bottom center point in the current span;
   e) repeating steps c) and d) until step d) results in one or more negative values of Lo greater than a pre-established threshold value;
   f) when one or more negative values result from step e), returning to the start span;
   g) moving one span to the left of the start span to a current span unless movement results in placement outside the boundaries of the bounding box;
   h) calculating values of Lo for each edge at the center and bottom center in the current span;
   i) repeating steps g) and h) until step h) results in one or more negative values of Lo greater than a pre-established threshold value;
   j) when one or more negative values greater than a pre-established threshold value results from step i), moving one span downward in a vertical direction to a current span unless movement results in placement outside the boundaries of the bounding box;
   k) repeating steps c) through j), until moving one span downward in a vertical direction results in placement outside the boundaries of the bounding box; and
   l) terminating the process when moving one span downward in a vertical direction results in placement outside the boundaries of the bounding box.

16. The method of claim 15, further including the steps of:
   a) selecting the most negative value from the values of Lo computed at the bottom center point for each edge computed at step d) and h) of claim 15;
   b) comparing the valued selected in step a) to the value selected from the previous span to select the most positive value;
   c) retaining the value selected in step b) as the optimum value from which to proceed down to the next span row in step j) of claim 15.

17. The method of claim 1, wherein step f) comprises:
   a) adding the horizontal gradient, Cx, to the vertex attribute start value for pixels located to the right of the start pixel;
   b) subtracting the horizontal gradient, Cx, from the vertex attribute start value for pixels located to the left of the start pixel; and
   c) adding the vertical gradient, Cy, to the vertex attribute start value for pixels located below the start pixel.

18. The method according to claim 1, wherein the step of interpolating attribute values at step f) further includes performing a fixed point add operation in the horizontal direction.

19. The method of claim 1, wherein the step of interpolating attribute values at step f) further includes performing a fixed point add operation in the vertical direction.

20. The method of claim 1, wherein a span is defined as a 4 by 4 rectangular grouping of pixels from said display.

21. An apparatus for performing a two dimensional interpolation of a plurality of vertex attributes of a primitive, comprised of a plurality of vertices and edges, said primitive being displayed by a plurality of pixels of a display, the display being comprised of a plurality of spans organized in a matrix of columns and rows, each span consisting of a grouping of pixels, the apparatus comprising:

a bounding box calculator for determining a bounding box of spans enclosing the primitive in two dimensions;

a plane converter coupled to said bounding box calculator for generating planar coefficients for each attribute of the primitive, and starting point line coefficients for each edge of the primitive, said planar coefficients and starting point line coefficients being generated at a start span within the dimensions of the bounding box;

a windower coupled to said plane converter for determining each span within said bounding box containing at least one pixel covered by the primitive in response to said starting point line coefficients received from said plane converter; and a plurality of incrementers coupled to said plane converter and said windower for receiving said planar coefficients, said plurality of incrementers receiving said planar coefficients from said plane converter and data from said windower defining those spans determined to potentially contain at least one pixel covered by said primitive, and interpolating attribute values of said plurality of vertex attributes at each pixel covered by said primitive.

22. The apparatus according to claim 21, where the windower further includes means for recalculating said starting point line coefficients for each edge of the primitive at two points in each span covered by said primitive.

23. The apparatus of claim 21, wherein the plane converter includes:

means for determining a reference pixel in the start span;

means for computing a starting attribute at the reference pixel for each of said plurality of vertex attributes;

means for computing a first gradient value at the reference pixel for each of said plurality of vertex attributes in a first dimension; and means for computing a second gradient value at the reference pixel for each of said plurality of vertex attributes in a second dimension.

24. The apparatus of claim 21, wherein said plane converter includes means for calculating the starting point line coefficients for each edge of the primitive at a reference pixel of the start span.

25. The apparatus of claim 24, wherein said plane converter includes means for calculating a first coefficient, Lo, representing a distance from the reference pixel to an edge of the primitive, and calculating coefficients Lx and Ly which represent a change in distance from the reference pixel to pixels to the right and below the reference pixel, respectively.

26. The apparatus of claim 25, wherein the Lo, Lx, and Ly coefficients represent perpendicular distances.

27. The apparatus of claim 25, wherein the Lo, Lx, and Ly coefficients represent Manhattan distances.

28. The apparatus of claim 21, wherein said windower includes:

means for determining each span at least partially covered by the primitive in one direction in a first span row containing the start span;

means for determining each span at least partially covered by the primitive in the opposite direction in the first span row containing the start span;

means for defining the optimum span from which to move down to a second span row;

means for moving down to a second span row from the optimum span to a second start span vertically contiguous with the optimum span;

means for determining each span at least partially covered by the primitive in one direction in the second span row;

means for determining each span at least partially covered by the primitive in the opposite direction in the second span row; and means for determining for subsequent span rows all spans covered by the primitive.

29. The apparatus of claim 28, wherein said windower includes means for recalculating said starting point line coefficients for each edge of the primitive at two reference points in each span at least partially covered by said primitive in each span row, and comparing the line coefficients for each span in each span row to define the optimum span.

30. The apparatus of claim 29, wherein the reference points are a center point and a bottom center point of each span.

* * * * *